(12) United States Patent
Lloyd

(10) Patent No.: US 11,888,716 B1
(45) Date of Patent: Jan. 30, 2024

(54) DYNAMIC SCHEDULING OF DATA TRANSMISSION FROM INTERNET OF THINGS (IOT) DEVICES BASED ON DENSITY OF IOT DEVICES

(71) Applicant: Samsara Networks Inc., San Francisco, CA (US)

(72) Inventor: Kevin Russell Coates Lloyd, San Carlos, CA (US)

(73) Assignee: Samsara Inc., San Francisco, CA (US)

( * ) Notice: Subject to any disclaimer, the term of this patent is extended or adjusted under 35 U.S.C. 154(b) by 54 days.

(21) Appl. No.: 17/448,338

(22) Filed: Sep. 21, 2021

Related U.S. Application Data

(60) Provisional application No. 63/140,737, filed on Jan. 22, 2021.

(51) Int. Cl.
| | |
|---|---|
| *H04L 43/0811* | (2022.01) |
| *H04L 43/16* | (2022.01) |
| *G16Y 10/75* | (2020.01) |
| *G16Y 40/10* | (2020.01) |

(52) U.S. Cl.
CPC .......... *H04L 43/0811* (2013.01); *G16Y 10/75* (2020.01); *G16Y 40/10* (2020.01); *H04L 43/16* (2013.01)

(58) Field of Classification Search
CPC ..... H04L 43/0811; H04L 43/16; G16Y 10/75; G16Y 40/10
USPC ........................................................ 709/224
See application file for complete search history.

(56) References Cited

U.S. PATENT DOCUMENTS

| | | | | |
|---|---|---|---|---|
| 2004/0229621 | A1* | 11/2004 | Misra | H04W 52/34 455/445 |
| 2012/0250570 | A1* | 10/2012 | Parker | H04L 43/0882 370/253 |
| 2017/0134959 | A1* | 5/2017 | Miura | H04W 16/32 |
| 2018/0063335 | A1* | 3/2018 | Guha | H04M 15/58 |
| 2020/0059683 | A1* | 2/2020 | Grigsby | H04L 65/752 |
| 2020/0344140 | A1* | 10/2020 | Cooblall | H04W 88/18 |
| 2022/0132365 | A1* | 4/2022 | Barton | H04W 28/0278 |

OTHER PUBLICATIONS

Behr Technologies Inc., "BehrTech Blog: 5 Reasons You Need an IoT Device Management Platform," 2020, downloaded from https://behrtech.com/blog/5-reasons-you-need-an-iot-device-management-platform/ on Nov. 20, 2020, 11 pages.

(Continued)

*Primary Examiner* — Meng Vang
(74) *Attorney, Agent, or Firm* — Nicholson, De Vos, Webster & Elliott, LLP

(57) ABSTRACT

Methods, systems, and apparatuses include evaluating a possibility of having more than a threshold number of connections with an access point of a network at a same time by multiple IoT devices that access the server through the network. In response to the evaluation, a determination of schedules for IoT devices is performed such that when the IoT devices operate according to the schedules the connections with the access point by the IoT devices that occur at the same time do not exceed the threshold number of connections. Configuration parameters are transmitted to the IoT devices causing the IoT devices to operate according to the schedules.

24 Claims, 6 Drawing Sheets

(56) References Cited

OTHER PUBLICATIONS

Behr Technologies Inc., "BehrTech Blog: IoT Scalability Issues: 5 Essential Considerations," 2020, downloaded from https://behrtech.com/blog/iot-scalability-issues/ on Nov. 20, 2020, 13 pages.
Bouzouita, et al., "Estimating the number of contending IoT devices in 5G networks: Revealing the invisible," Transactions on emerging telecommunications technologies, Wiley-Blackwell, Nov. 2018, pp. 1-18.
Ksentini, et al., Cellular-based Machine-to-Machine (M2M): Overload Control, IEEE Network 26(6):54-60, Nov. 2012, 15 pages.
Vasisht, et al., "FarmBeats: An IoT Platform for Data-Driven Agriculture," 14th USENIX Symposium on Networked Systems Design and Implementation (NSDI 17), Mar. 2017, pp. 515-529.

* cited by examiner

DYNAMIC SCHEDULING OF DATA TRANSMISSION FROM INTERNET OF THINGS (IOT) DEVICES BASED ON DENSITY OF IOT DEVICES

CROSS-REFERENCE TO RELATED APPLICATIONS

This application claims the benefit of U.S. Provisional Application No. 63/140,737 filed Jan. 22, 2021, which is hereby incorporated by reference.

TECHNICAL FIELD

One or more embodiments relate to the field of Internet of Things (IoT) systems; and more specifically, to dynamic scheduling of data transmission from IoT devices based on density of the IoT devices.

BACKGROUND ART

IoT devices are deployed and used to support a variety of applications and use cases. In non-limiting examples, the IoT devices can be used in fleet management applications, asset tracking applications, industrial applications (manufacturing analytics, process monitoring, condition monitoring), and remote monitoring of environments (such as in factories, warehouses, etc.), etc.

In some applications, several IoT devices can be present in a geographical area. For example, IoT devices in vehicles and trailers at a warehouse, or IoT industrial sensors deployed in a manufacture, a farm, or any other geographical area. The IoT devices use cellular connections to communicate over a wireless network and the Internet with a backend system. The backend system may include a management server that is operative to record data received from the IoT devices and transmit data and/or configuration parameters to the IoT devices. The IoT devices connect to an access point (AP) of the wireless network to communicate with the backend system. When too many devices try to communicate over the same access point at the same time, the number of devices and/or the amount of bandwidth of the communications established between the devices and the AP can overwhelm the cellular network and cause a deterioration of the quality of service. When too many devices overwhelm the AP, the network service provider can block one or multiple devices from accessing the cellular network through the AP.

BRIEF DESCRIPTION OF THE DRAWINGS

The following figures use like reference numbers to refer to like elements. Although the following figures depict various exemplary embodiments, alternative embodiments are within the spirit and scope of the appended claims. In the drawings:

DETAILED DESCRIPTION

Figure 1:
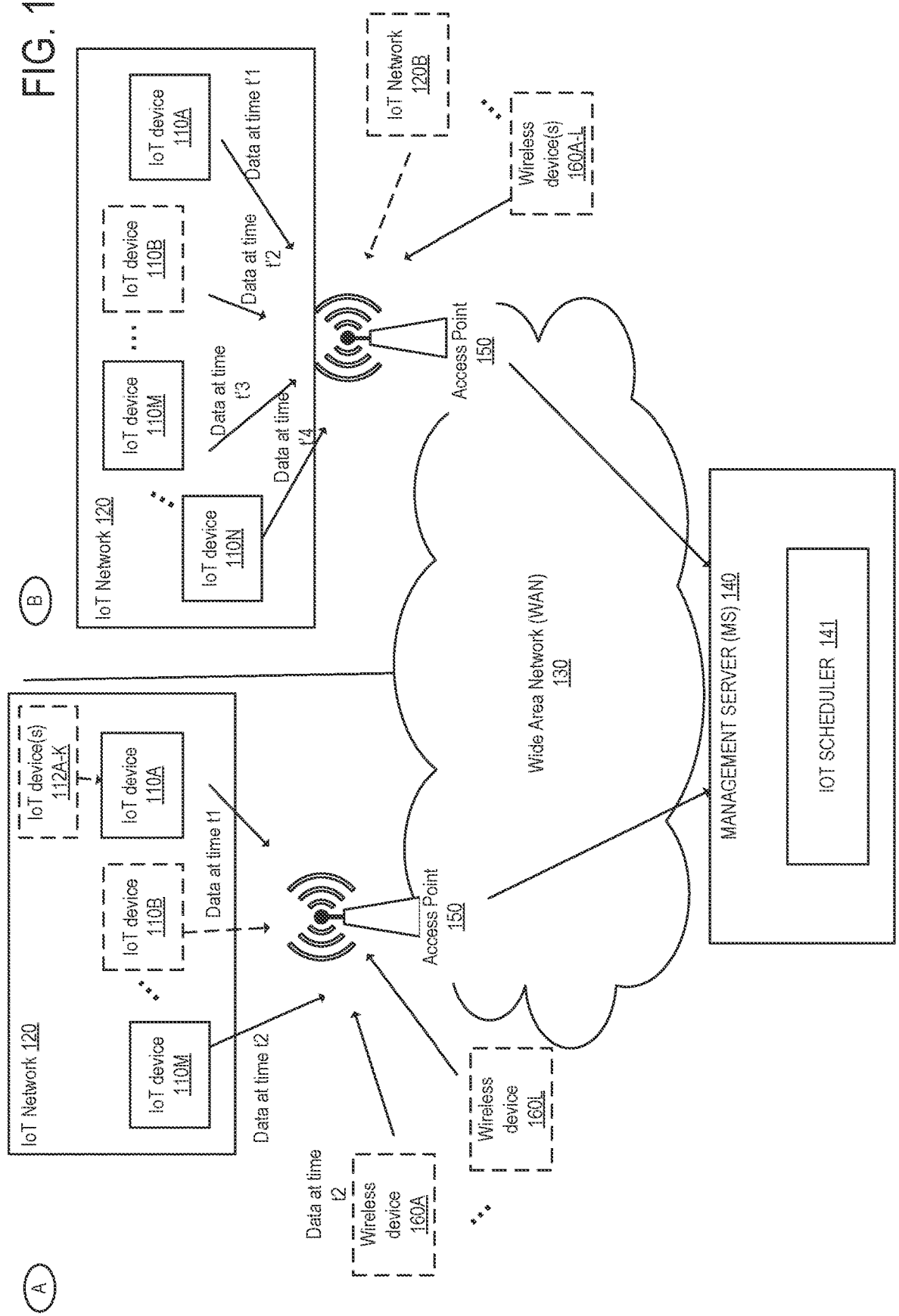
FIG. 1 is a block diagram illustrating a system for enabling a dynamic scheduling of data transmission from IoT devices based on density of the IoT devices, according to some example embodiments.

The following description describes methods and apparatus for dynamic scheduling of data transmission from IoT devices based on density of IoT devices around an access point of a wireless network. IoT devices are deployed and used to support a variety of applications and use cases. In non-limiting examples, the IoT devices can be used in fleet management applications, asset tracking applications, industrial applications (manufacturing analytics, process monitoring, condition monitoring), and remote monitoring of environments (such as in factories, warehouses, etc.), etc.

Overview

With the spread of IoT based applications and support for wireless communications enabled in IoT devices, there is an increase in the connections established with access points of the wireless network and an increase of the bandwidth of these APs. The increase of connections and bandwidth usage can overwhelm the APs and the wireless network, causing delays, and a deterioration of user experience. In IoT networks, these issues can cause a loss of data or delay in the receipt of data. Some approaches try to address this by preventing the overload at access points from the service provider's perspective. In these approaches, the network provider that owns or operates the access network may configure the network to block access at an access point to some devices that request access when there is a risk of overload of the access point. These approaches attempt to estimate a number of potential wireless devices that will access an access point and determine a probability of blocking wireless devices to prevent the overload. In these approaches, an access point is configured to block a given number of wireless devices to prevent the overload of the access point. However, these approaches may cause the network to block access to IoT devices of an IoT network resulting in a loss of data or delay of data transfer from the IoT devices. The loss or delay of data can be inacceptable in some critical applications, such temperature monitoring, or location tracking, etc.

In some approaches the IoT devices can be pre-configured with a particular schedule for transmitting data through the wireless connection. However, when additional IoT devices are added to the network, it becomes challenging to update the schedule to allow for less device connections at the same time. These approaches have limited effect on the prevention of devices being blocked by network providers as the scheduling of data transmission from IoT devices does not change based on the number of devices connecting to a given access point increasing/decreasing over time.

Since an access network provider may block IoT devices if a given access point of a network access provider is at risk or has been overloaded by too many devices being connected to that access point at the same time, it is desirable to reduce the probability of such a blockage by avoiding too many IoT devices being connected to the same access point at the same time.

The embodiments described herein present a method and a system for enabling a dynamic scheduling of data transmission from IoT devices through a wireless network based on density of IoT devices. The system includes a management server and multiple IoT devices that communicate with the management server over at least one access point of a network provider's network. The multiple IoT devices include a first type of IoT device, and optionally a second type. Those of the first type are capable of wireless connectivity to the access point, and may be: 1) devices capable of providing that connectivity to only themselves; or 2) devices capable of providing that connectivity to themselves and other IoT devices. The access point of the provider's network may be shared with other devices (e.g., IoT devices, phones, desktop computers, etc.) that do not connect to the management server. The embodiments described herein present methods and systems that reduce the probability of a blockage by an AP by dynamically controlling a number of IoT devices that can connect to the same access point at the same time.

In one embodiment, a server evaluates whether there is a possibility of having more than a threshold number of connections with an access point of a network at a same time by a plurality of IoT devices that access the server through the network. In response to evaluating that there is a possibility of having more than the threshold number of connections with the access point of the network at the same time by the plurality of IoT devices that access the server, the server determines one or more schedules for one or more IoT devices from the plurality of IoT devices such that when the one or more IoT devices operate according to the one or more schedules the connections with the access point by the plurality of IoT devices that occur at the same time do not exceed the threshold number of connections, where a schedule of the one or more schedules defines a timing of a connection of an IoT device from the plurality of IoT devices with the access point, and transmits one or more configuration parameters to the one or more IoT devices from the plurality of IoT devices that cause the one or more IoT devices to operate according to the one or more schedules.

FIG. 1 is a block diagram illustrating a system for dynamic scheduling of data transmission from IoT devices based on density of the IoT devices, according to some example embodiments. The illustrated system includes multiple IoT devices 110A-M, a management server 140, an access point (which is referred to here as AP) 150, optional one or more wireless devices 160A, and optional one or more IoT devices 112A-K.

The IoT devices 110A-N and optional IoT devices 112A-K are part of an IoT network. The IoT devices 110A-N are of a first type of IoT device and the IoT devices 112A-K are of a second type of IoT devices. An IoT device 110 from the IoT devices 110A-N is an electronic device that is operative to be coupled with the management server 140 through a Wide Area Network (WAN) 130. In some embodiments, the IoT device can be located on a mobile asset (e.g., a vehicle, a truck, a trailer, etc.), on a stationary asset (e.g., a voting booth, a wall, a water meter, etc.), or in any other location. The connection to the WAN 130 is a wireless connection (e.g., Wi-Fi, cellular connection, etc.). To establish a connection with the WAN, the IoT device connects to a wireless access point, e.g., AP 150. In some embodiments, the IoT device 110 and the management server 140 may be subject to an intermittent connectivity with the WAN. The IoT device 110 can be implemented as described with reference to FIG. 4.

In some embodiments, the IoT devices 110A-N are of a second type of IoT devices and can be referred to as a gateway devices (GWs). A GW is operative to be coupled with other IoT devices, such as IoT devices 112A-K, to receive/transmit data from/to the WSDs and transmit/receive this data to/from the management server 140.

In some embodiments, the IoT device 110 can be an electronic device that includes one or more sensors for detecting physical events (e.g., temperature, humidity, barometric pressure, CO2 concentration, acceleration, pressure, sound, movement, etc.) and is operative to record sensor measurements in response to the detection of these physical events and to communicate these sensor measurements to the management server 140 through the network 130.

The system further includes a management server 140. The management server 140 is a cloud-based server operative to receive data from one or more electronic devices (e.g., the IoT devices 110A-N). The data may include sensor measurements such as temperature readings and/or location readings. The management server 140 is operative to configure the IoT devices 110A-N and optionally the IoT devices 112A-K to transmit data according to a given schedule. In some embodiments, the management server 140 includes an IoT scheduler 141 that is operative to dynamically determine a schedule for transmission of data from the IoT devices through the network 130. While the IoT scheduler is illustrated as part of the management server 140 that is operative to configure the IoT device, in some embodiments, the determination of the schedule and the configuration of the IoT devices can be performed independently from one another. In some embodiments, the management server 140 is implemented as described in further details with reference to FIG. 5. While the management server 140 is illustrated as being operative to be coupled with a single IoT network that includes the IoT devices 110A-N and optional IoT devices 112A-K, one of ordinary skill in the art would understand that the management server 140 may receive/transmit data from/to multiple IoT networks. The IoT devices of an IoT network may belong to a single administrative entity (e.g., organization, household, person, etc.) or alternatively the IoT devices may belong to multiple administrative entities, which are also referred to as tenants.

The access point 150 is a network electronic device that allows other wireless network devices to connect to a wired network. The AP can be a Wi-Fi access point that provides access to a local area network and/or a wide area network. The AP can be a base station of a cellular network and provides cellular communication access to the IoT devices. In some embodiments, the AP is part of an access network that includes multiple ones of the access points. The access network is owned and operated by a network provider. In some embodiments, the network provider is different from the entity that owns and/or operates the IoT networks. The operator/administrator(s) of the IoT networks do not have control over the access network and in particular do not have control over AP 150. In some embodiments, AP 150 enables the IoT devices to connect to the WAN 130 through wireless connections (e.g., WIFI, or cellular.

FIG. 1 illustrates a first time interval, A, during which the IoT devices 110A-M are deployed and a second interval of time B during which the IoT devices 110A-N are deployed. In some embodiments, the IoT device 110A is coupled with optional IoT devices 112A-K. During the first interval A, the IoT devices 110A-M connect to AP 150 to transmit and/or receive data to/from the management server 140. In some embodiments, additional wireless devices, e.g., wireless device 160A-L can connect to AP 150. Wireless devices 160A-L are not part of the IoT network 120. The wireless devices 160A-L are electronic devices that do not access the management server 140. The wireless devices 160A-L can be computers, mobile phones, other IoT devices, or any other stationary or mobile electronic devices that have capability of connecting to the access point. During the second interval of time, B, additional IoT devices connect to AP 150. In some embodiments, an additional IoT device may connect to AP 150 as a result of a mobile device on which the IoT device is mounted moving into the geographical area covered by AP 150 (e.g., a cell of AP 150). For example, the IoT device may be a GW mounted on a vehicle that enters the geographical area served by AP 150. The geographical area can be a warehouse in which a wireless network is deployed. In another example, the geographical area can be a portion of a highway that is served by a base station of a cellular network. Additionally or alternatively, an additional IoT device may connect to AP 150 as a result of the additional IoT device being added to the IoT network 120. A user or administrator of the IoT network 120 may initialize and set up a new IoT device in the geographical area that is served by AP 150.

During the first interval of time A, the IoT devices 110A-M are configured to transmit data to the management server according to one or multiple initial schedules. The transmission of data to AP 150 may include transmitting a connection request to AP 150 as part of a connection procedure between the IoT devices and AP 150. The transmission of data may further include transmission of sensor measurements. The sensor measurements can be recorded by the IoT device itself or received from another one of the IoT devices, e.g., IoT devices 112A-K. In some embodiments, multiple ones of IoT devices 110A-M can be configured by the management server 140 to transmit data according to the same schedule such that the transmission of the data for these multiple IoT devices occurs at the same time. For example, IoT device 110A and IoT device 110B can transmit data to AP 150 at the same time. In some embodiments, two or more of the IoT devices 110A-M can be configured to transmit data according to different schedules such that transmission of data occurs at different times. For example, IoT device 110A and IoT device 110M are configured to transmit data to AP 150 at different times, t1 and t2, respectively. In some embodiments, a schedule for an IoT device can include a start time and date, at which transmission of data from the IoT device is to start, and an interval of time after which transmission of data is to be repeated from the start time. For example, a schedule can include January 1, at 12 AM, and an interval of 1 h. According to this schedule, an IoT device will attempt transmission of data starting on January 1, at 12 AM and will repeat the attempt every hour after that. In some embodiments, the schedule can include a predetermined list of times during a day at which transmission of data is attempted. For example, the schedule can include a list including 5 AM, 5 PM as two times during a day at which the IoT device is to attempt connection with AP 150. While some examples of schedules are presented herein, other examples can be contemplated without departing from the scope of the embodiments herein.

The IoT scheduler 141 is operative to evaluate whether one or more schedules of the IoT devices 110A-N and optionally schedules of the IoT devices 112A-K need to be modified. The evaluation of whether to modify a schedule is performed at least in part based on the density of the IoT devices in a geographical area around AP 150. Upon determining that at least one schedule needs to be modified, the management server 140 transmits schedule parameters to one or more of the IoT devices 110A-N and optionally to one or more of the IoT devices 112A-K. The schedule parameter defines one or more updated schedules for the IoT devices. When configured, the IoT devices operate according to the updated schedules during the second interval of time B. The updated schedules are determined to prevent multiple ones of the IoT devices 110A-N from transmitting data to the management server 140 at the same time, where multiple IoT devices is more than a threshold. The updated schedules prevent an overload of AP 150 that could be caused by the IoT devices 110A-N if they tried to simultaneously connect to AP 150. The operations of the system 100 will be described in further detail below with reference to the flow diagrams.

Dynamic Scheduling of Data Transmission from IoT Devices

The operations in the flow diagrams herein will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 2A:
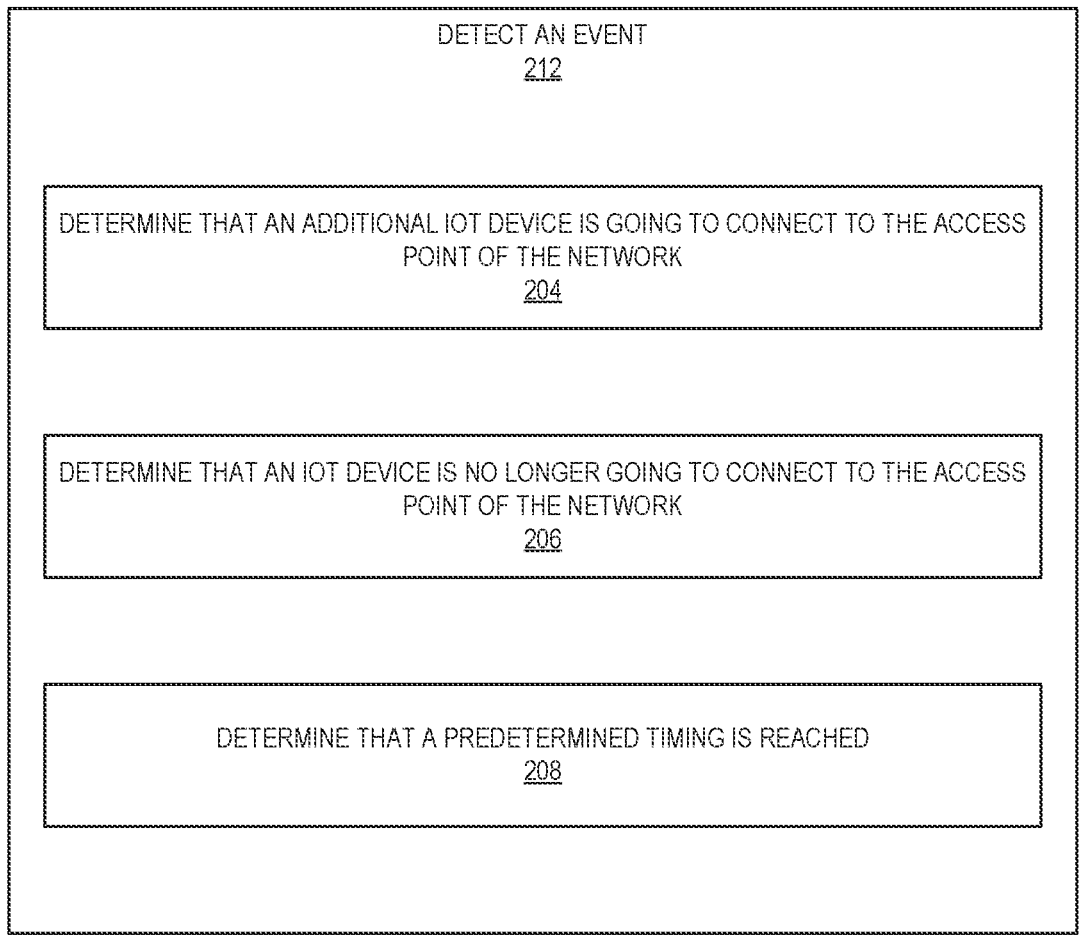
FIG. 2A illustrates a flow diagram of exemplary operations that can be performed for detecting an event, in accordance with some embodiments.

FIG. 2A illustrates a flow diagram of exemplary operations that can be performed for detecting an event. The operations of FIG. 2A can be performed by the management server 140. In some embodiments, the management server continuously monitors the IoT network to detect an event. The event is related to an access point in a network. In some embodiments, the management server 140 is independent from the system that controls and operate the access point. In some embodiments, the IoT network may include multiple IoT devices that are spread across a large geographical area, where the IoT devices may connect to access the management server via multiple access points of a network. In some embodiments, the management server may be operative to manage multiple IoT networks. In some embodiments, the operations described herein can be performed for each access point to which IoT devices that need to access the management server connect.

In some embodiments, the event can be an indication that an additional IoT device is going to connect to the access point of the network. In some embodiments, the event can be an indication that an IoT device is no longer going to connect to the access point of the network. In some embodiments, the event can be reaching a scheduled timing.

The detection of the event can include operation 204, operation 206, operation 208, or any combination of two or more of these operations. At operation 204, the management server 140 determines that an additional IoT device, e.g., IoT device 110N, is going to connect to the access point 150 of the network. In some embodiments, determining that the additional IoT device 110N is going to connect to the access point 150 includes receiving from the IoT device 110N a location reading of the IoT device 110N, and determining from the location reading that the IoT device 110N is within the geographical area served by AP 150. The location reading of the IoT device 110N is recorded by a location sensor (e.g., GPS). The location sensor can be part of the IoT device 110N. Alternatively, the location sensor can be included in another IoT device (e.g., an IoT device of second type) that is coupled with the IoT device 110N for accessing the management server 140. In some embodiments, determining that the additional IoT device 110N is going to connect to AP 150 further includes determining that the IoT device 110N was not part of IoT devices, e.g., IoT devices 110A-M previously associated with AP 150. The determination that the IoT device 110N is not part of the IoT devices 110A-M can be performed by comparing an identifier of the IoT device 110N with identifiers of the IoT devices 110A-M. The identifier of the IoT device 110N uniquely identifies the IoT device 110N in the IoT network 120. The identifier of the IoT device 110N can be received from the IoT device 110N through the network 130.

In some embodiments, determining that the additional IoT device 110N is going to connect to AP 150 to access the server 140 is performed based on an identifier of AP 150. The identifier of AP 150 can be received by the server 140 with data from the IoT device 110N. The data may include sensor measurements, or other data transmitted by the IoT device 110N. In some embodiments, when connecting to AP 150, the IoT device 110N obtains an identifier that uniquely identifies AP 150 among other access points of a network. The IoT device 110N is operative to transmit the identifier of AP 150 to the management server 140.

In some embodiments, detecting the event includes determining, operation 206, an IoT device is no longer going to connect to AP 150 to access the server 140. In some embodiments, determining that the IoT device is no longer going to connect to AP 150 includes receiving an indication that the IoT device is turned off, or receiving an indication that the IoT device is removed from the IoT network 120. In some embodiments, the determination can be performed based on a location reading received from the IoT device and determining that the IoT device is no longer at a location that is covered by AP 150. For example, the IoT device might have moved to another location (e.g., if mounted on a vehicle, the vehicle moved).

In some embodiments, detecting the event includes determining, at operation 208, that a predetermined timing is reached. For example, the server can be operative to perform the operations of FIG. 2B when a time of the day is reached (e.g., according to a set schedule: 1 PM, 5 PM, 12 AM, etc. . . . ), or at a regular interval of time (e.g., every hour, every 30 minutes, every 12 h, once a day, etc.).

Figure 2B:
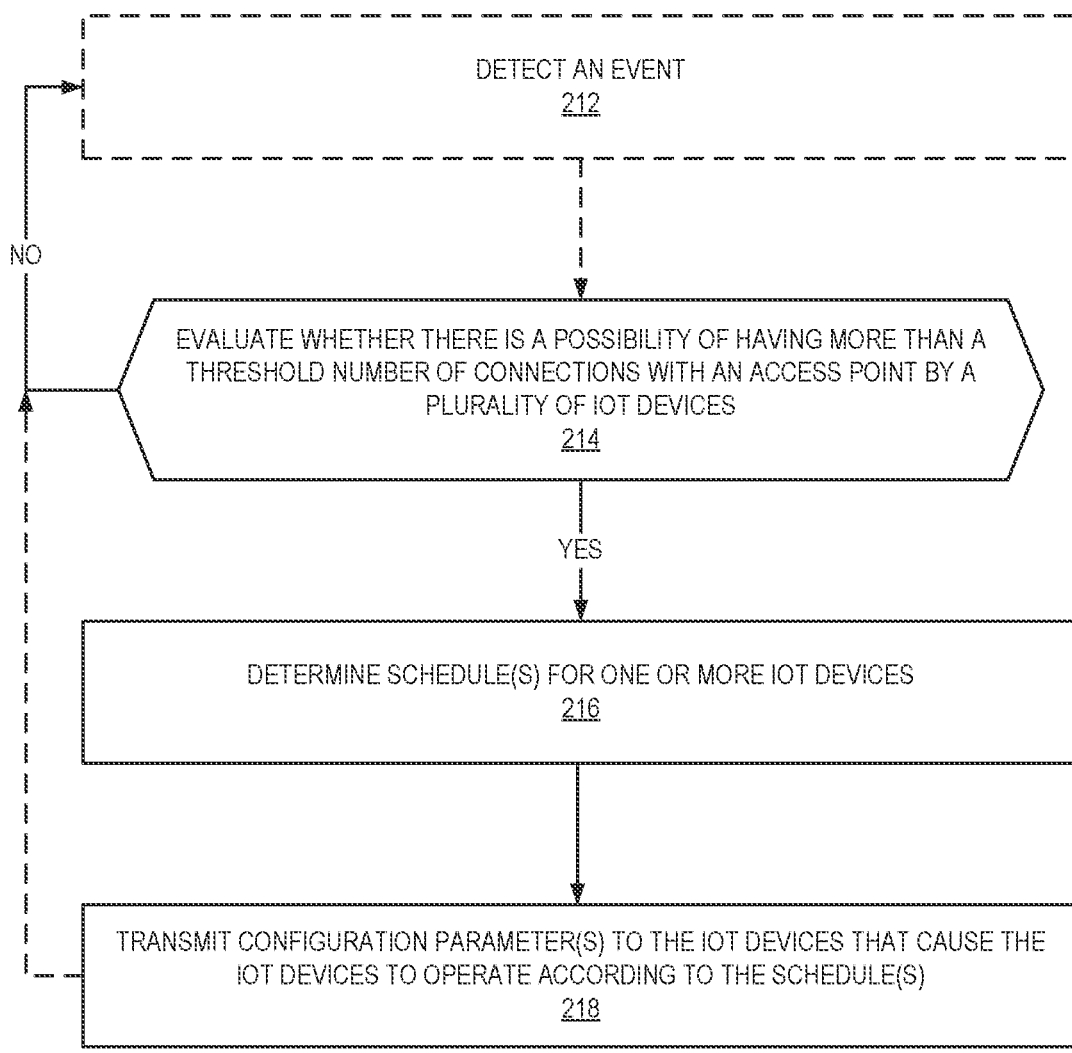
FIG. 2B illustrates a flow diagram of exemplary operations that can be performed for dynamic scheduling of data transmission from IoT devices, in accordance with some embodiments.

In some embodiments, the management sever may be operative to perform one or multiple ones of the operations 204, 206, and 208 to detect an event and cause the operations of FIG. 2B to be performed.

FIG. 2B illustrates a flow diagram of exemplary operations that can be performed for dynamic scheduling of data transmission from IoT devices, in accordance with some embodiments. The operations of the flow diagram can be performed by the management server 140. Alternatively, some operations of the flow diagram can be performed by the management server 140 while others by the IoT scheduler 141 when the IoT scheduler is implemented independently from the management server 140.

At operation 212, the management server 140 detects an event. The detection of the event can be performed as described with reference to FIG. 2A. In some embodiments, if no event is detected, the server 140 continues to monitor the system for the detection of events.

The flow of operations moves to operation 214. At operation 214, the server 140 evaluates whether there is a possibility of having more than a threshold number of connections with an access point of a network at a same time by multiple IoT devices that access the server through the network. In some embodiments, evaluating whether there is a possibility of having more than a threshold number of connections with AP 150 of a network 130 at a same time by multiple IoT devices 110A-N that access the server through the network 130 includes estimating a number of IoT devices that will connect to the access point at the same time. In some embodiments, the estimation of the number of IoT devices is performed based on geographic locations of the IoT devices. The server 140 receives from the IoT devices location readings indicating the respective locations of the IoT devices. The server 140 determines that the IoT devices are within a predetermined distance of one another and are likely to be served by the AP 150 based on a known location of the AP 150. The geographical area considered by the server can include considering all IoT device within half a mile of the location of AP 150. In other examples, the size of the geographical region around AP 150 can be determined dynamically. For example, when a rural area is considered the range of the distance can be increased (e.g., 1 mile, 2 miles). Alternatively, when an urban area is considered the range of the distance can be decreased (e.g., 0.5 miles, etc.).

In some embodiments, the estimation of the number of IoT devices can be performed based on the identifier of AP 150. The server 140 receives from each one of the IoT devices 110A-N an identifier of AP 150. The identifier is obtained by the IoT device upon connection with AP 150. The IoT device can request and obtain from AP 150 a base station identifier. In another example, the IoT device can request and obtain a MAC address of a Wi-Fi access point. In some embodiments, in addition to or instead of an identifier of the AP 150, the estimation of the number of IoT devices can be performed based on an identifier of the network. For example, the IoT device can obtain from AP 150 an identifier of the cellular provider to which AP 150 belongs. In another example, the IoT device can obtain the SSID of the wireless network. These identifiers can be transmitted to the server 140 and used in combination with a location reading of the IoT device to determine IoT devices are likely to connect to the same AP 150.

In some embodiments, the server 140 may use a combination of the location readings received from IoT devices and identifier of AP 150 received from IoT devices to estimate the number of IoT devices that are likely to connect to AP 150 to access the server 140. In some embodiments, the server 140 may use the location readings for some of the IoT devices (e.g., if the identifier of AP 150 is not available for those IoT devices), and may use the identifier of AP 150 for other IoT devices.

Once a number of IoT devices that connect to AP 150 is estimated, the server 140 determines if the identified IoT devices are to connect to the AP 150 at the same time. This determination can be performed based on existing schedules of the IoT devices. For example, each IoT devices may operate according to an initial schedule. The server compares these initial schedules and determine that for at least one occurrence, the IoT devices are going to attempt connection with AP 150 at the same time. When it is determined that there is at least one occurrence in time in which the IoT devices, e.g., IoT 110A-N will connect to AP 150 at the same time, the server 140 determines if the number of these devices causes the number of possible connections between the IoT devices and AP 150 to be greater than the threshold number of connections with AP 150.

In response to evaluating that there is a possibility of having more than the threshold number of connections with the access point of the network at the same time by the IoT devices 110A-N, the flow of operation moves to operation 216. If it is determined that there is not a possibility of having more than the threshold number of connections with AP 150 at the same time by the IoT devices 110A-N, the flow of operations moves to operation 212. The server continues to monitor the system and is operative to detect the event at operation 212.

At operation 216, the server 140 determines one or more schedules for one or more IoT devices from the plurality of IoT devices. The schedules are determined such that when the IoT devices operate according to the schedules the connections with the access point by the plurality of IoT devices that occur at the same time do not exceed the threshold number of connections. A schedule defines a timing of a connection of an IoT device from the plurality of IoT devices with AP 150. In some embodiments, a subset of the schedules of all of the IoT devices that are determined to connect to the same AP, e.g., IoT devices 110A-N, are modified. The subset can include one or more schedules for the IoT devices. In some embodiments, some IoT devices will still transmit data at the same time, however, when compared to an earlier time before the update of the schedules, this number is reduced. In other embodiments, the schedules are determined such that no two IoT devices connect to AP 150 at the same time. In some embodiments, the schedules are determined such that the transmission of data from the IoT devices to the management server through AP 150 is staggered. A first IoT device 110A transmits data at a first time, t' 1, a second IoT device 110B transmits data at a second time, t'2, and a third IoT device 110N transmits data at a third time, t'4, where t' 1, t'2, and t'4 are different from one another. The schedules can be determined dynamically based on the number of devices and duration of expected communication between the IoT device and the management server. For example, the schedule can be determined such that not more than 25 devices attempt to connect to AP 150 at the same time.

The flow moves to operation 218. At operation 218, the server 140 transmits one or more configuration parameters to the one or more IoT devices that cause the one or more IoT devices to operate according to the one or more schedules. In some embodiments, only a subset of the IoT devices receives configuration parameters for updated schedules. In other embodiments, all of the IoT devices 110A-N have updated schedules and configuration parameters are transmitted to all of them. The configuration parameters can include a time to start transmission of data, and an interval of time after which the IoT device is to repeat transmission of the data. In some embodiments the configuration parameters can include a set of times or dates at which the IoT device is to transmit data to the management server by accessing an AP. In some embodiments, the configuration parameters indicate a target period with which the IoT device is to check in with the management server (e.g., transmit data to the management server or establish a connection with the management server) by accessing an AP and also indicate a random variance to apply to the target period. For example, if the target period is indicated as being every four hours and the random variance is indicated as being +/−30 minutes, then the IoT device may check in with the management server by accessing the AP every four hours +/−30 minutes, where the IoT device may randomly choose a time within that range (e.g., randomly choose a time that is between 3 hours 30 minutes and 4 hours 30 minutes after the previous check in).

Exemplary Environment

Figure 3:
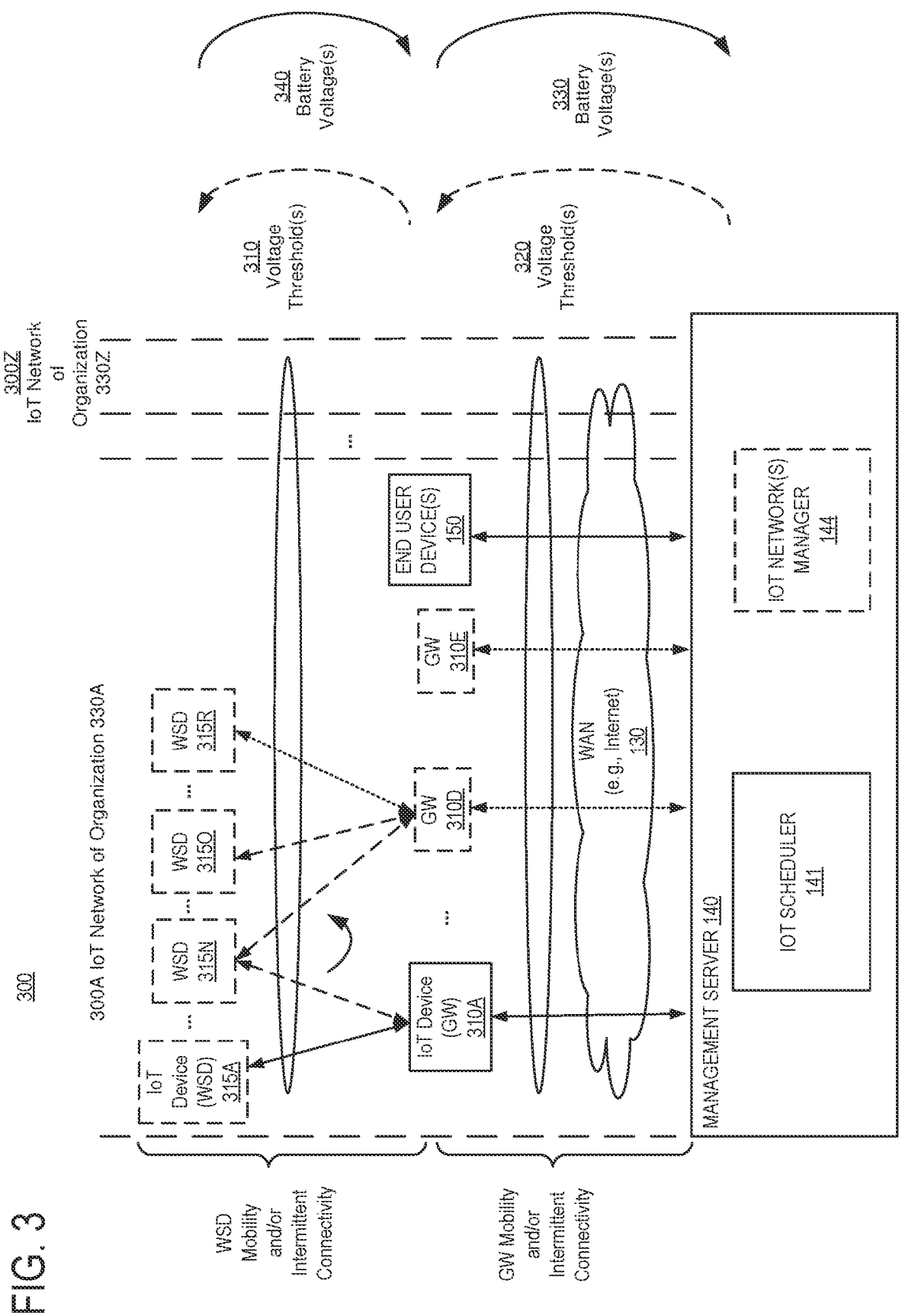
FIG. 3 illustrates a block diagram of exemplary IoT networks, in accordance with some embodiments.

FIG. 3 illustrates a block diagram of exemplary IoT networks 300, in accordance with some embodiments. The management server 140 provides an IoT network service to one or more organizations. As illustrated in FIG. 3, the management server 140 may be coupled, through the WAN 130, to a plurality of gateway devices and wireless sensing devices forming multiple IoT networks (e.g., 300A-300Z) belonging to respective organizations (e.g., 310A-310Z). Each organization possesses a set of wireless sensing devices and gateways for monitoring physical events (e.g., monitoring the temperature of refrigerated goods being transported, monitoring fleets of vehicles by recording location, movement and/or acceleration information, monitoring humidity and/or temperature at various locations within a room or a building, etc.).

IoT Network 300A of organization 360A is an exemplary deployment of an IoT network including a plurality of IoT devices, which may include wireless sensing devices and gateway devices. The IoT network 300A includes a plurality of WSDs coupled with one or more gateway devices. For example, WSDs 315A to 315N are coupled to gateway device (GW) 310A, WSDs 3150 to 315R are coupled with GW 310D, etc. While four WSDs, and three gateway devices are illustrated, the IoT network 300A may include more WSDs and gateway devices. Each one of the gateway devices may be mobile or stationary. For example, the GW 310D may be a mobile gateway device located within a vehicle transporting goods, which also includes one or more mobile WSDs that can connect to the gateway device. The IoT network service enables the offload of data, from the wireless sensing devices (e.g., 315A-315N) to the management server 140 through a first communication channel between the GWs (e.g., GW 110A-110D) and the WSDs and through a second communication channel 1020 between the management server 140 and the GWs of the IoT network 300A. In some embodiments, a gateway device, e.g., GW 310E, may not be coupled to any WSDs, and the data transmitted to the management server 140 is data recorded by the gateway device itself. The offload of data from the GWs to the management server 140 through the WAN 130 includes a connection of the GWs with one or more wireless access points of the network 130 (e.g., Wi-Fi access points, cellular base stations, etc.).

In some embodiments, the IoT network service enables the WSDs to offload data to one of the gateway devices of the same organization as soon as one of the gateway devices is within range of the WSD and a connection is established, while deleting data only when a confirmation is received from the gateway devices. In addition, the gateway devices are operative to store the data from the WSDs and offload to the management server when a connection is established without deletion of the data prior to the receipt of an acknowledgement message from the management server. This ensures that all data transmitted from the WSDs is received at the management server 140 even in scenarios of mobility of the devices or intermittent connectivity. The management server 140 reconciles the data received from each WSD through one or more gateway devices (which may occur potentially following multiple connection interruptions or mobility of the WSD) to present to a user of the organization an uninterrupted representation of the sensor measurements of each WSD.

The IoT network service is a multi-tenant service and may process and manage data from various IoT networks (e.g., 360A, 360Z) belonging to different organizations while ensuring that data recorded by a WSD of a first organization (e.g., 310A) is not transmitted to a user of the second organization (e.g., 360Z). The management server 140 is operative to continuously monitor a state of the IoT networks and update the schedule of data transmission from the GWs to the management server 140, and optionally from the WSDs to the GWs, based on the density of the GWs in a given geographical location. The update of the schedules is triggered when it is determined that a number of IoT devices that is to connect to the same AP is likely to cause a number of connections of the IoT devices to exceed a threshold number of IoT connections with the AP. The server 140 sends configuration parameters to at least one of the GW to update the schedule. The updated schedule(s) cause the multiple IoT devices of an IoT network to stagger the connections with the same AP over an interval of time instead of transmitting the data at the same time.

In some embodiments, a customer of the IoT service may be interested in obtaining data recorded at the same time from the multiple IoT devices that are deployed. In these embodiments, while the transmission of the data is scheduled in a staggered manner, the GW devices (and WSDs) may continuously record and store data until a transmission time is reached (according to the schedule). Thus, while the transmission of data may occur at a time that is different from a time originally configured or required by the customer, the data remains complete and the customer is presented with uninterrupted set of data from the multiple IoT devices of the IoT network.

The dynamic update of the schedules for data transmission from the IoT devices based on the number of IoT devices aims at reducing the probability of an IoT device being blocked by an AP when attempting to access the network 130 through that AP. The dynamic update of the schedules reduces the risk that an AP becomes overloaded due to the number of IoT devices from the particular IoT network that is managed by management server 140.

Exemplary Electronic Devices

One or more parts of the above embodiments may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off, or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long-term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to other electronic device(s) (sometimes referred to as a client electronic device, a client computing device, or a client device) that executes client software (sometimes referred to as client code or an end-user client) to communicate with the service. The server and client electronic devices may be operated by users respectively in the roles of administrator (also known as an administrative user) and end-user.

Alternative embodiments of an electronic device may have numerous variations from that described above. For example, customized hardware and/or accelerators might also be used in an electronic device.

Figure 4:
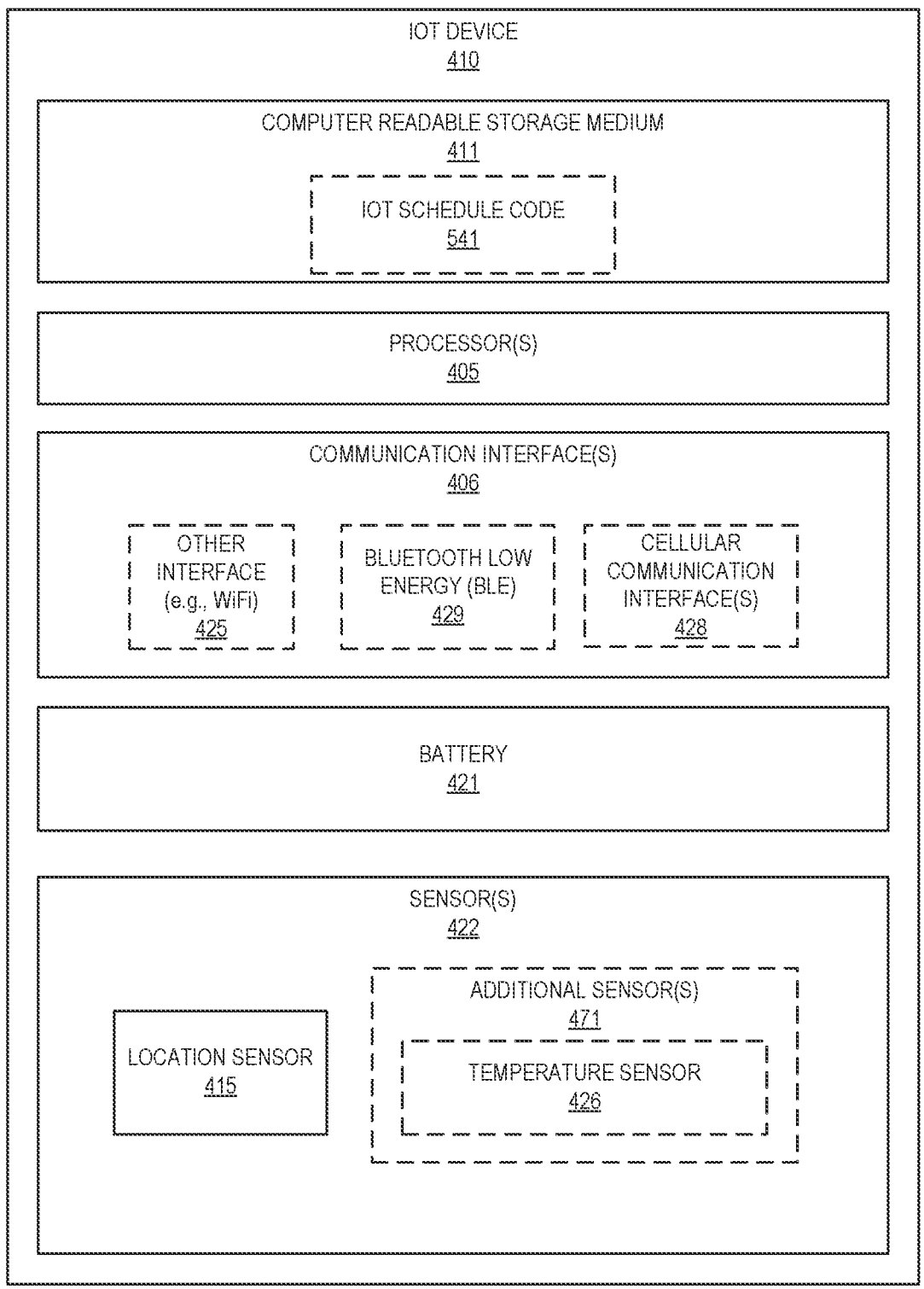
FIG. 4 illustrates a block diagram of an IoT device that can be used in some embodiments.

FIG. 4 illustrates a block diagram of an IoT device that can be used in some embodiments. IoT device 410 includes one or more processors 405 and a computer-readable storage medium 411, which is coupled to the processor(s) 405. The computer-readable storage medium 411 may be used for storing data, metadata, and programs for execution by the processor(s) 405. For example, the depicted computer-readable storage medium 411 may store IoT scheduling code that, when executed by the processor(s) 405, causes the IoT device 410 (e.g., IoT device 110N) to transmit the data to the management server 140 according to a predetermined schedule. The battery 421 powers the IoT device 410.

The IoT device 410 also includes one or more sensors used to record sensor measurements in response to physical events. For example, the IoT device 410 includes a location sensor 415. The location sensor (e.g., Global Positioning System (GPS) sensor) is operative to determine a geographical location of the IoT device 410. The IoT device 410 may include one or more additional sensors 471 (e.g., temperature sensor 426, humidity sensor, barometric pressure sensor, $CO_2$ concentration sensor, acceleration sensor, sound sensor, movement sensor, etc.). In some embodiments, one or more of the additional sensors can be integrated into the IoT device 410. In other embodiments, one or more of the additional sensors can be separate from the IoT device 410. When an additional sensor is separate from the IoT device 410, it can connect to the IoT device 410 through a wireless communication interface (e.g., a short-range communication interface such as BT or BLE, or other) or alternatively it can connect via a wired communication interface (e.g., a general-purpose input/output (GPIO)).

The IoT device 410 also includes one or more communication interfaces 406, which are provided to allow a user to provide input to, receive output from, and otherwise transfer data to and from the device. Exemplary Input/

Output devices and interfaces include wired and wireless transceivers, such as Joint Test Action Group (JTAG) transceiver, a Bluetooth Low Energy (LE) transceiver 429 an IEEE 802.11 transceiver, an infrared transceiver, a wireless cellular communication interface (e.g., 2G, 3G, 4G, 5G, etc.) 428, a diagnostic port, or another wireless protocol 425 to connect the IoT device 410 with another device, external component, or a network, and receive stored instructions, data, tokens, etc. It will be appreciated that one or more buses may be used to interconnect the various components shown in FIG. 4.

It will be appreciated that additional components, not shown, may also be part of the IoT device 410, and, in certain embodiments, fewer components than that shown in FIG. 4, may also be used in an IoT device 410. In some embodiments, the IoT device 410 may act as a gateway system or alternatively as a wireless sensing device.

The wireless sensing devices (WSDs) are electronic devices that include one or more sensors for detecting physical events (e.g., temperature, humidity, barometric pressure, CO2 concentration, acceleration, pressure, sound, movement, location etc.) and recording sensor measurements in response to the detection of these physical events. The WSDs can then store the sensor measurements related to physical events detected over a period of time. The WSDs may record sensor measurements at regular intervals of time (e.g., the WSDs may detect the temperature of a room, or an object (e.g., refrigerator, food product), and record corresponding temperature measurements every N seconds or minutes). The sensor measurements are stored in a non-transitory computer readable medium of the WSDs. Each of the WSDs is operative to be coupled to the gateway system and establish a communication channel to transfer the recorded sensor measurements. In some embodiments, each of the WSDs can connect to the gateway system through a wireless communication interface (e.g., Bluetooth Low Energy (BLE), Wi-Fi). Thus, the WSDs are operative to detect a gateway device and negotiate a connection to the gateway device. In some embodiments, the IoT device 110 can be a WSD that is operative to be coupled with gateway devices for transmitting/receiving data to/from the management server 140. When compared to a gateway device, a WSD is a smaller and less complex device. For example, a WSD may not include a cellular network interface, while a gateway device may include the cellular communication interface. In these example embodiments the gateway system connects to the management server through the cellular communication (and/or Wi-Fi) and the WSD connects to the gateway system through a short-range communication interface such as a Bluetooth LE interface.

Figure 5:
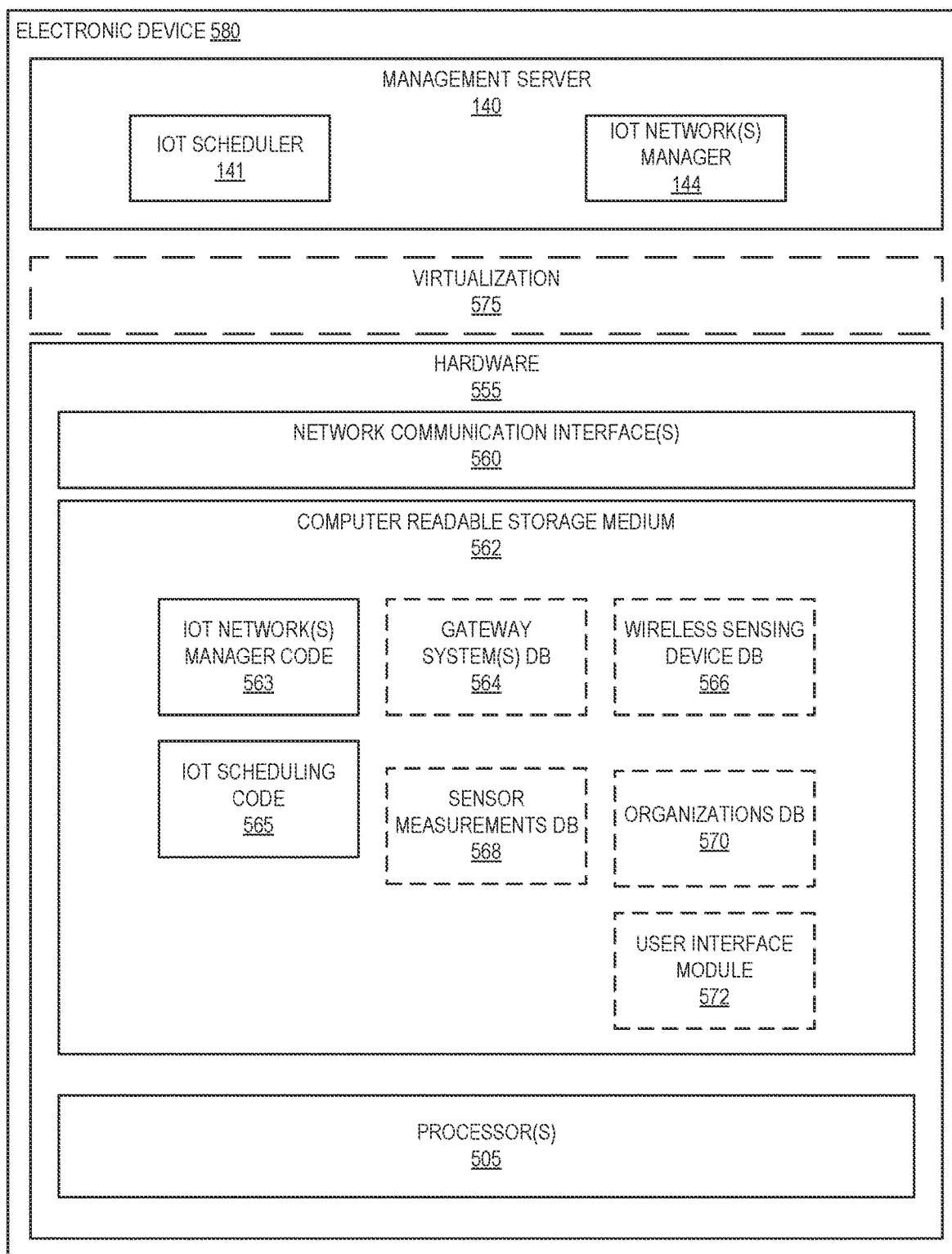
FIG. 5 illustrates a block diagram of an exemplary management server that can be used in some embodiments.

FIG. 5 illustrates a block diagram of an exemplary management server that can be used in some embodiments. Management server 140 may be a web or cloud server, or a cluster of servers, running on server hardware. In one embodiment, the management server 140 works for both single and multi-tenant installations, meaning that multiple organizations with different administrators may have IoT devices (e.g., wireless sensing devices and/or gateway systems) managed by the same management server.

According to one embodiment, management server 140 is implemented on an electronic device 580 which includes hardware 555. Hardware 555 includes network communication interfaces 560 coupled with one or more processor(s) 565, and a computer-readable storage medium 562. The computer-readable storage medium 562 includes an IoT network manager code 563, which when executed by the processor(s) 505, causes the management server 140 to configure and manage the IoT device(s) (e.g., IoT devices 110A-N and IoT devices 112A-K), which may include gateway systems and/or wireless sensing device(s) for each organization. The computer-readable storage medium 562 includes an IoT scheduling code 565, which when executed by the processor(s) 505, causes the IoT scheduler 141 of the management server 140 to monitor the IoT devices and update schedules of the IoT devices according to their density as described with reference to FIGS. 1-3.

In an embodiment, the computer-readable storage medium 562 further includes a user interface module 572, which when executed on the processor(s) 865 causes the display of a Web interface on a client device. The Web interface allows administrators and/or users to create and log into an account associated with an organization to which a set of IoT devices belong (e.g., IoT device 110). The user interface module 572 can be used for managing and configuring the IoT devices. The computer readable storage medium 562 further includes the sensor measurement database 578 (including data indicative of sensor measurements received from the IoT devices (e.g., temperature measurements)), optional gateway systems database 564 (including information regarding the gateway systems when the IoT devices include gateway systems), an optional wireless sensing device database 566 (including information regarding the WSDs when the IoT devices include WSDs), and an optional organizations database 570 (including information regarding the organizations to which the IoT devices belong).

While one embodiment does not implement virtualization, alternative embodiments may use different forms of virtualization—represented by a virtualization layer 575. In these embodiments, the management server 140, and the hardware that executes it, form a virtual management server which is a software instance of the modules stored on the computer-readable storage medium 562. In electronic devices that use compute virtualization, the set of one or more processor(s) 565 typically execute software to instantiate the virtualization layer 575 and software container(s) (e.g., with operating system-level virtualization, the virtualization layer 575 represents the kernel of an operating system (or a shim executing on a base operating system) that allows for the creation of multiple software containers (representing separate user space instances and also called virtualization engines, virtual private servers, or jails) that may each be used to execute a set of one or more applications; with full virtualization, the virtualization layer 575 represents a hypervisor (sometimes referred to as a virtual machine monitor (VMM)) or a hypervisor executing on top of a host operating system, and the software containers, each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software is executed within the software container on the virtualization layer 575. In electronic devices where compute virtualization is not used, the instance on top of a host operating system is executed on the "bare metal" electronic device. The instantiation of the instance, as well as the virtualization layer and software containers, if implemented, are collectively referred to as software instance(s). The electronic device 580 can be used to perform the operations of a management server as described with reference to FIGS. 1-3.

While some components of the IoT device or the management server are illustrated as code stored on the computer-readable storage medium, in other embodiments the modules may be implemented in hardware or in a combination of hardware and software.

Conclusion

In the above description, numerous specific details such as resource partitioning/sharing/duplication embodiments, types and interrelationships of system components, and logic partitioning/integration choices are set forth in order to provide a more thorough understanding. It will be appreciated, however, by one skilled in the art, that the invention may be practiced without such specific details. In other instances, control structures, logic embodiments, opcodes, means to specify operands, and full software instruction sequences have not been shown in detail since those of ordinary skill in the art, with the included descriptions, will be able to implement what is described without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations and/or structures that add additional features to some embodiments. However, such notation should not be taken to mean that these are the only options or optional operations, and/or that blocks with solid borders are not optional in certain embodiments.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary embodiments in the other figures. However, the operations of the flow diagrams can be performed by embodiments other than those discussed with reference to the other figures, and the embodiments discussed with reference to these other figures can perform operations different from those discussed with reference to the flow diagrams.

While the above description includes several exemplary embodiments, those skilled in the art will recognize that the invention is not limited to the embodiments described and can be practiced with modification and alteration within the spirit and scope of the appended claims. The description is thus illustrative instead of limiting.

What is claimed is:

1. A method in a server located in a cloud, the method comprising:

evaluating whether there is a possibility of having more than a threshold number of connections with an access point of a network at a same time by a plurality of Internet of Things (IoT) devices that access the server through the network wherein the server is separate from the access point; and in response to evaluating that there is a possibility of having more than the threshold number of connections with the access point of the network at the same time by the plurality of IoT devices that access the server, performing the following:

determining one or more schedules for one or more IoT devices from the plurality of IoT devices such that when the one or more IoT devices operate according to the one or more schedules the connections with the access point by the plurality of IoT devices that occur at the same time do not exceed the threshold number of connections, wherein a schedule of the one or more schedules defines a timing of an IoT device from the plurality of IoT devices accessing the server through a connection with the access point, and transmitting one or more configuration parameters to the one or more IoT devices from the plurality of IoT devices that cause the one or more IoT devices to operate according to the one or more schedules.

2. The method of claim 1, wherein the evaluating whether there is a possibility of having more than the threshold number of connections with the access point of the network at the same time by the plurality of IoT devices that access the server includes:

estimating, based on geographic locations of the plurality of IoT devices, a number of IoT devices that will connect to the access point at the same time.

3. The method of claim 1, wherein the evaluating whether there is a possibility of having more than a threshold number of connections with an access point of the network at a same time by the plurality of IoT devices that access the server includes:

estimating, based at least in part on an identifier of the access point, a number of IoT devices that will connect to the access point at the same time.

4. The method of claim 1, wherein the evaluating whether there is a possibility of having more than a threshold number of connections with an access point of the network at a same time by the plurality of IoT devices that access the server is performed in response to an indication that an additional IoT device is going to connect to the access point of the network.

5. The method of claim 1, wherein the evaluating whether there is a possibility of having more than a threshold number of connections with an access point of the network at a same time by the plurality of IoT devices that access the server is performed in response to an indication that an IoT device is no longer going to connect to the access point of the network.

6. The method of claim 1, wherein the evaluating whether there is a possibility of having more than a threshold number of connections with an access point of the network at a same time by the plurality of IoT devices that access the server is performed according to a predetermined timing.

7. The method of claim 1, wherein the determining one or more schedules for one or more IoT devices from the plurality of IoT devices is performed according to a number of the plurality of IoT devices, an amount of time needed for communication between the plurality of IoT devices and the server, requirements of an administrator of the plurality of IoT devices, or any combination thereof.

8. The method of claim 1, wherein the one or more configuration parameters indicate a target period with which an IoT device is to check in with the server by accessing the access point and a random variance to apply to the target period.

9. A non-transitory machine-readable storage medium that provides instructions that, if executed by a processor of a server located in a cloud will cause said processor to perform operations comprising:
- evaluating whether there is a possibility of having more than a threshold number of connections with an access point of a network at a same time by a plurality of Internet of Things (IoT) devices that access the server through the network wherein the server is separate from the access point; and
- in response to evaluating that there is a possibility of having more than the threshold number of connections with the access point of the network at the same time by the plurality of IoT devices that access the server, performing the following:
  - determining one or more schedules for one or more IoT devices from the plurality of IoT devices such that when the one or more IoT devices operate according to the one or more schedules the connections with the access point by the plurality of IoT devices that occur at the same time do not exceed the threshold number of connections, wherein a schedule of the one or more schedules defines a timing of an IoT device from the plurality of IoT devices accessing the server through a connection with the access point, and
  - transmitting a configuration parameter to the one or more IoT devices from the plurality of IoT devices that cause the one or more IoT devices to operate according to the one or more schedules.

10. The non-transitory machine-readable storage medium of claim 9, wherein the evaluating whether there is a possibility of having more than a threshold number of connections with an access point of the network at a same time by the plurality of IoT devices that access the server includes:
- estimating, based on geographic locations of the plurality of IoT devices, a number of IoT devices that will connect to the access point at the same time.

11. The non-transitory machine-readable storage medium of claim 9, wherein the evaluating whether there is a possibility of having more than a threshold number of connections with an access point of the network at a same time by the plurality of IoT devices that access the server includes:
- estimating, based at least in part on an identifier of the access point, a number of IoT devices that will connect to the access point at the same time.

12. The non-transitory machine-readable storage medium of claim 9, wherein the evaluating whether there is a possibility of having more than a threshold number of connections with an access point of the network at a same time by the plurality of IoT devices that access the server is performed in response to an indication that an additional IoT device is going to connect to the access point of the network.

13. The non-transitory machine-readable storage medium of claim 9, wherein the evaluating whether there is a possibility of having more than a threshold number of connections with an access point of the network at a same time by the plurality of IoT devices that access the server is performed in response to an indication that an IoT device is no longer going to connect to the access point of the network.

14. The non-transitory machine-readable storage medium of claim 9, wherein the evaluating whether there is a possibility of having more than a threshold number of connections with an access point of the network at a same time by the plurality of IoT devices that access the server is performed according to a predetermined timing.

15. The non-transitory machine-readable storage medium of claim 9, wherein the determining one or more schedules for one or more IoT devices from the plurality of IoT devices is performed according to a number of the plurality of IoT devices, an amount of time needed for communication between the plurality of IoT devices and the server, requirements of an administrator of the plurality of IoT devices, or any combination thereof.

16. The non-transitory machine-readable storage medium of claim 9, wherein the one or more configuration parameters indicate a target period with which an IoT device is to check in with the server by accessing the access point and a random variance to apply to the target period.

17. A system comprising:
- one or more processors; and
- a non-transitory machine-readable storage medium that stores instructions, which when executed by the one or more processors cause the system to perform operations including:
  - evaluating whether there is a possibility of having more than a threshold number of connections with an access point of a network at a same time by a plurality of Internet of Things (IoT) devices that access a server through the network, wherein the server is separate from the access point, and
  - in response to evaluating that there is a possibility of having more than the threshold number of connections with the access point of the network at the same time by the plurality of IoT devices that access the server, performing the following:
    - determining one or more schedules for one or more IoT devices from the plurality of IoT devices such that when the one or more IoT devices operate according to the one or more schedules the connections with the access point by the plurality of IoT devices that occur at the same time do not exceed the threshold number of connections, wherein a schedule of the one or more schedules defines a timing of an IoT device from the plurality of IoT devices accessing the server through a connection with the access point, and
    - transmitting a configuration parameter to the one or more IoT devices from the plurality of IoT devices that cause the one or more IoT devices to operate according to the one or more schedules.

18. The system of claim 17, wherein the evaluating whether there is a possibility of having more than a threshold number of connections with an access point of the network at a same time by the plurality of IoT devices that access the server includes:
- estimating, based on geographic locations of the plurality of IoT devices, a number of IoT devices that will connect to the access point at the same time.

19. The system of claim 17, wherein the evaluating whether there is a possibility of having more than a threshold number of connections with an access point of the network at a same time by the plurality of IoT devices that access the server includes:
- estimating, based at least in part on an identifier of the access point, a number of IoT devices that will connect to the access point at the same time.

20. The system of claim 17, wherein the evaluating whether there is a possibility of having more than a threshold number of connections with an access point of the network at a same time by the plurality of IoT devices that access the server is performed in response to an indication that an additional IoT device is going to connect to the access point of the network.

21. The system of claim 17, wherein the evaluating whether there is a possibility of having more than a threshold number of connections with an access point of the network at a same time by the plurality of IoT devices that access the server is performed in response to an indication that an IoT device is no longer going to connect to the access point of the network.

22. The system of claim 17, wherein the evaluating whether there is a possibility of having more than a threshold number of connections with an access point of the network at a same time by the plurality of IoT devices that access the server is performed according to a predetermined timing.

23. The system of claim 17, wherein the determining one or more schedules for one or more IoT devices from the plurality of IoT devices is performed according to a number of the plurality of IoT devices, an amount of time needed for communication between the plurality of IoT devices and the server, requirements of an administrator of the plurality of IoT devices, or any combination thereof.

24. The system of claim 17, wherein the one or more configuration parameters indicate a target period with which an IoT device is to check in with the server by accessing the access point and a random variance to apply to the target period.

* * * * *